United States Patent [19]

Trigg et al.

[11] 4,273,329
[45] Jun. 16, 1981

[54] FLAG PIN ATTACHMENT INCLUDING BALL DISTANCE MEASURING LINE AND TURF REPAIR TOOL

[76] Inventors: Donald L. Trigg, 10934 Gazette Ave., Chatsworth, Calif. 91311; Richard V. Portolan, 557 Daroca Ave., San Gabriel, Calif. 91775

[21] Appl. No.: 129,917

[22] Filed: Mar. 13, 1980

[51] Int. Cl.³ .............................................. A63B 57/00
[52] U.S. Cl. ............................... 273/32 B; 33/137 R; 273/34 R; 273/DIG. 21
[58] Field of Search .......... 273/DIG. 21, 32 R, 32 A, 273/32 B, 34 R; 33/138, 137 R

[56] References Cited

U.S. PATENT DOCUMENTS

| 1,106,152 | 8/1914 | McIntosh et al. | 33/138 X |
| 2,041,119 | 5/1936 | Duganne | 273/34 R |

FOREIGN PATENT DOCUMENTS

| 12495 | of 1906 | United Kingdom | 33/137 R |
| 205401 | 10/1923 | United Kingdom | 33/137 R |

Primary Examiner—George J. Marlo
Attorney, Agent, or Firm—Nilsson, Robbins, Dalgarn, Berliner, Carson & Wurst

[57] ABSTRACT

A housing containing a spring loaded retractable spool of line with a hooking member for attaching either the end of the line or the housing to a golf hole flag pole in order to play out the string from the spool to measure the distance between the flag stick and a golf ball on a putting green. In the embodiment where the housing is attached to the flag stick, the hooking member is formed from two pivotally connected clip members having arcuate first ends and pointed second ends. The arcuate first ends cooperate with each other to encircle the flag stick, for attaching the housing thereto, and the pointed second ends function as a tool for repairing ball marks in the turf. The line may have a marker slidably attached to the line for use when measuring the distance of a plurality of different golf balls from the flag stick.

2 Claims, 4 Drawing Figures

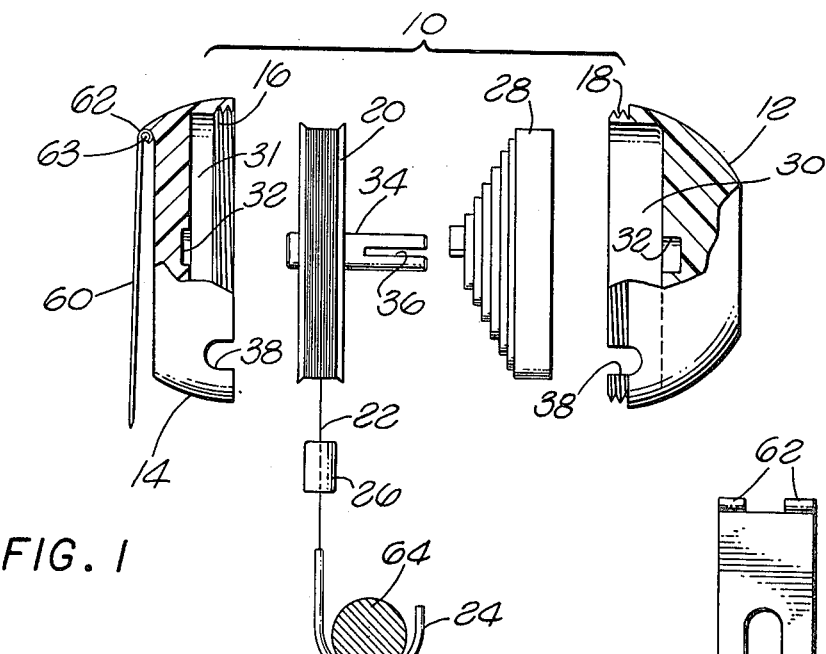
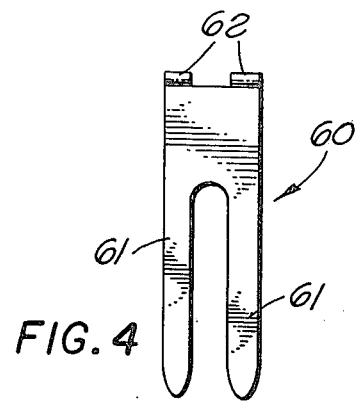
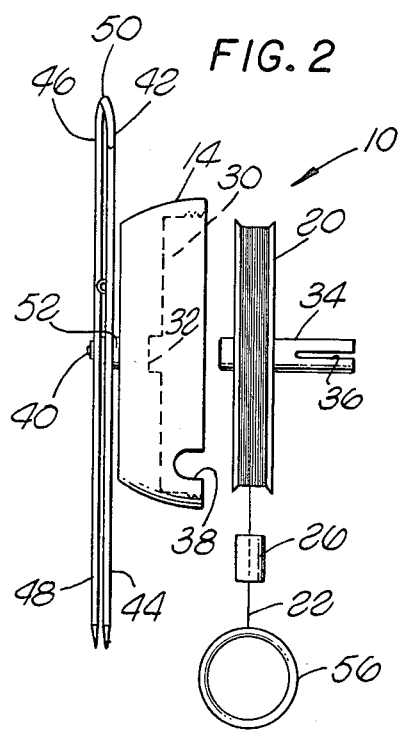
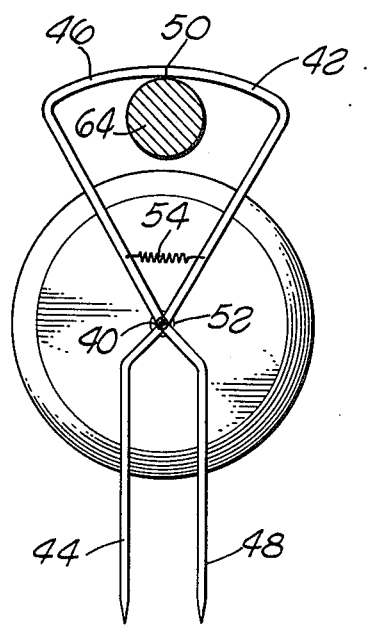

FLAG PIN ATTACHMENT INCLUDING BALL DISTANCE MEASURING LINE AND TURF REPAIR TOOL

BACKGROUND OF THE INVENTION

This invention relates generally to a novel tool for use in playing golf. More particularly, this invention concerns an apparatus for measuring the distance between the golf hole flag stick and a ball on the putting surface of the green, which also contains a ball mark repair tool.

During the play of the game of golf it is often desirable to determine, while on the putting green and ready to putt, who is away, i.e., who is the first person required to putt. This is determined from the fact of who is furthest from the hole. As is often the case, individual players may be close enough in distance from the hole in different directions around the hole, that it is sometimes difficult to ascertain who is away. This is resolved at the present time by either pacing the distance from the hole to each ball on the green, or alternatively, by using a measuring device such as the golf hole flag stick itself, golf clubs, or the like. Such methods of measuring are either inaccurate, or cumbersome, or both.

When a golf ball is hit onto the putting green with any degree of trajectory, the ball will leave a ball mark, referred to as a divot, on the green, particularly if the green is wet and soft. Such divots or ball marks must be repaired to prevent damage to the green of sufficient intensity that the grass under the ball mark will be killed, thereby leaving brown spots and holes in the green. Ball marks are normally repaired by a pronged instrument which a golfer may use to lift the compacted soil where the ball has struck the green and raise it to a position so that it can again be level with the green and loosened so that the grass will continue to grow at that spot.

The present invention is directed to an apparatus which incorporates both a ball mark repairing tool and a measuring instrument, with the measuring instrument being particularly adapted for measurement of the distance between the flag stick or pin on the putting green to a golf ball, or a plurality of balls, to determine which is furthest away from the cup.

In the past, it has been known to combine a ball mark repair tool with a housing containing a retractable string, as is illustrated in the patent to Doyle, U.S. Pat. No. 3,309,089. However, in the patent to Doyle, the disclosed retractable string has attached to the end of it a plumb for use to plumb the slope of the putting surface in order to predict any break the putt will make in its travel towards the hole. There is no suggestion in the patent to Doyle of a measuring instrument for determining the distance of a ball away from the cup.

The problems enumerated in the foregoing discussion of the prior art apparatus and methods are not intended to be exhaustive, but rather, are among many which tend to impair the effectiveness of the prior art apparatus and methods. Other noteworthy problems may also exist; however, those presented above should be sufficient to demonstrate that prior art apparatus and methods have not been altogether satisfactory.

SUMMARY OF THE PREFERRED EMBODIMENTS OF THE INVENTION

Recognizing the need for an improved means for measuring the distance of a putt from the flag stick, it is, therefore, a general feature of the present invention to provide a novel measuring device which minimizes or reduces the problems of the type previously noted.

A feature of the present invention resides in a compact housing which may be carried in the pocket or worn, e.g., on the belt of a golfer, containing a spool of line which is spring loaded to be retractable back onto the spool.

Another feature of the present invention resides in means for attaching the end of the line or the housing to a flag stick for the purpose of measuring the distance from the flag stick to a ball on the green.

Yet another feature of the present invention resides in a ball mark repair tool being attached to the housing.

Still another feature of the present invention resides in the ball mark repair tool serving as a clip to attach the housing to an article of the golfer's clothing, e.g., the golfer's belt or his trouser waistband and also to the flag stick.

A compact putt distance measuring apparatus according to the presently preferred embodiment of the invention, intended to substantially incorporate the foregoing features, includes a housing having a hollow interior which contains a spool attached to a coiled spring, e.g., a clockwork type spring, which is in turn attached to the housing, with the spool containing a suitable length of fishing line, e.g., lightweight monofilament line, which line is unwound from the spool through an opening in the housing. A means for attaching either the end of the line or the housing to the flag stick for the purpose of making the measurement desired, is attached, respectively, to the end of the line or to the housing. A slidable marker may be affixed to the line, and a ball mark repair tool is attached to the housing, and may form a portion of the means for attaching the housing to the flag flag stick.

Examples of the more important features of the present invention have thus been summarized rather broadly in order that the detailed description thereof that follows may be better understood, and in order that the contribution to the art may be better appreciated. There are, of course, additional features of the invention that will be described hereafter and which will also form the subject of the appended claims. These features and advantages of the present invention become apparent with reference to the following detailed description of a preferred embodiment thereof in connection with the accompanying drawings, wherein like reference numerals have been applied to like elements, in which:

BRIEF DESCRIPTION OF THE DRAWINGS

FIG. 1 depicts an exploded side elevational view of the present invention with the right and left side housings partially cut away;

FIG. 2 shows an exploded side elevational view of a portion of the apparatus shown in FIG. 1 with a second embodiment of the ball mark repair tool according to the present invention;

FIG. 3 shows a front elevational view of the embodiment shown in FIG. 2;

FIG. 4 shows a front elevational view of the ball mark repair tool of the embodiment shown in FIG. 1.

DETAILED DESCRIPTION OF THE PREFERRED EMBODIMENTS OF THE INVENTION

Turning first to FIG. 1, an exploded side elevational view of a putting distance measuring apparatus 10 according to the present invention is shown. A measurement apparatus 10 has a right side housing 12 and a left side housing 14, with the left side housing 14 having female threads 16, and the right side housing 12 having male threads 18 such that the left side housing screws onto the right side housing 12. A spool 20 is provided with a suitable length of line, e.g., lightweight monofilament fishing line 22 wound thereon. A hook 24 is attached by any suitable means to the end of the line 22, and a marking device, which may be a cylindrical piece of plastic having a bore therethrough, through which the line 22 may be threaded, is slidably attached to the line 22.

A spring 28, e.g., a coil spring of the clockwork type, is attached to the housing and fits within a hollow area 30 in the right side housing 12. The left side housing also has a hollow area 31, and each of the hollow areas 30, 31 is provided with a recess 32 which act as bearing surfaces in which a shaft 34 attached to the center of the spool 20, is rotatably engaged. The shaft 34 has a slot 36 for engaging the end of the coiled spring 28 for the purpose of retracting the line 22 due to the coiled spring pressure on the spool 20 when the extended line 22 is released.

The line 22 exits the interior portion 30, 31 of the housing 12, 14 through an opening which is defined by two slots 38 cut in each of the respective right and left side housing, 12, 14, and which are aligned with each other when the left side housing 14 is screwed onto the right side housing 12.

Turning now to FIGS. 2 and 3, the second embodiment of the invention is shown. In this embodiment, the left side housing 14 is shown to have a shaft 40 attached thereto, onto which are rotatably attached a left clip half 42 and a right clip half 46. The right clip half 42 has an arcuate portion and a straight portion forming a prong 44. The left clip half 46 has an arcuate portion and a straight portion forming a prong 48. The ends of the arcuate portions of the left clip half 42 and right clip half 46 engage each other at 50. A washer 52 separates the right and left clip halves 42, 46 from the body of the housing, and a spring 54 biases the right and left clip halves 42, 46 into engagement at point 50. In this embodiment, the hook 24 may be replaced by a ring 56 attached to the end of the line 22.

Turning now to FIG. 4 there is shown a ball mark repair tool 60 which may be used along with the embodiment of the invention shown in FIG. 1. The ball mark repair tool is shown to have two prongs 61, and hinge pieces 62 through which a pin 63 is inserted to hingedly attach the ball mark repair tool 60 to a further hinge piece (not shown) attached to the left side housing 14 in a location generally shown in FIG. 1.

In operation, the embodiment shown in FIG. 1 is used by placing the hook 24 in engagement with the flag stick 64, shown in cross-section in FIG. 1, and pulling the housing 12, 14 to play out the line 22 to measure the distance to a ball on the putting green. The housing may also be pulled sufficiently to move the Housing beyond the location of the ball being measured, with the slide member 26 then being positioned along the line 22 to indicate the distance from the flag stick 64 to the ball in question.

In operation of the embodiment shown in FIGS. 2 and 3, the housing 12, 14 is attached to the flag stick 64 by pressing inwardly on the prongs 44, 48 to disengage the arcuate portions of the right and left clip members 42, 46 sufficiently to insert the flag stick 64 between the clip members 42, 46 and then releasing the pressure on the prongs 44, 48 such that the spring 54 will cause the right and left clip members 42, 46 to reengage each other at 50 and lock the housing onto the flag stick 64. The line 22 is then played out by pulling ring 56 to the location of the ball desired to be marked, or beyond that point, using the slide member 26 to mark the location of the ball.

The prongs 44, 48 in the embodiment shown in FIGS. 2 and 3 extend sufficiently beyond the circumference of the housing to act as a ball mark repair tool. The ball mark repair tool 60 shown in FIG. 1 and the right and left clip members 42, 46 also act as a clip to attach the housing 14, 12 to an article of clothing of the golfer, e.g., the golfer's belt or trouser waistband, by inserting the belt or the waistband between the prongs 44, 48 and housing 14 in the embodiment shown in FIG. 2 or the ball mark repair tool 60 and housing 14 as shown in the embodiment of FIG. 1.

SUMMARY OF THE ADVANTAGES AND SCOPE OF THE INVENTION

It will be appreciated that in constructing a golf distance measuring apparatus according to the present invention, certain significant advantages are provided. In particular, a compact, lightweight measuring apparatus is provided which is easily worn or carried by the golfer and affords a simple, expeditious and very accurate measurement of the distance between the flag stick and a ball on the putting surface. A measuring apparatus also has attached thereto a readily available ball mark repair tool which also serves as a means for attaching the measuring apparatus to the golfer's clothing. With the use of the slide member, several balls may be compared in distance in succession quite readily. Once the measurement is completed, the line is retracted into the housing by virtue of the coiled spring means.

The foregoing description of the invention has been directed to a particular preferred embodiment in accordance with the requirements of the Patent Statutes and for purposes of explanation and illustration. It will be apparent, however, to those skilled in this art that many modifications and changes in both apparatus and method may be made without departing from the scope and spirit of the invention. For example, the spool and spring could have in combination with them a suitable ratchet device well known in tthe art which would prevent the spring from retracting the line into the housing until the ratchet was released by the user of the measuring device by operating a suitable ratchet release mechanism. It will be further apparent that the invention may also be utilized, with suitable modifications within the state of the art, which would be apparent to those skilled in this art. It is the applicant's intention in the following claims to cover all such equivalent modifications and variations as fall within the true spirit and scope of the invention.

What is claimed is:

1. An apparatus for use in playing golf, comprising: a housing;

a spool rotatably attached to said housing, said spool containing a length of line wound on said spool, said line having a first end and a second end, and attached to said spool at said first end;

a coiled spring attached to said spool and said housing, said spring being caused to distort from a relaxed position in response to said line being unwound by rotation of said spool, and said spring returning to said relaxed position, causing said spool to rotate to rewind said line, when the tension on said line is released;

an attaching member including a clip affixed to said housing and adapted to engage a golf hole flag stick as said line is unwound from said spool, said clip including a shaft attached to said housing, a first clip member having a prong portion and an arcuate portion, formed integrally with said prong portion, and having an end, and a second clip member having a prong portion and an arcuate portion, formed integrally with said prong portion, and having an end, and, said first and second clip members being pivotally attached to said shaft;

a spring attached to said first and second clip members, said spring urging said ends of said arcuate sections into contact.

2. The apparatus of claim 1 further comprising:

said prong portions being of sufficient length to be used as a ball mark repair tool without interference by said housing; and, said first and second clip members being spaced apart from said housing along said shaft sufficiently to allow a portion of a piece of clothing of the user of the apparatus to fit between said housing and said first and second clip members to thereby hold the apparatus on said piece of clothing.

* * * * *